United States Patent [19]

Thornhill

[11] Patent Number: 5,130,033
[45] Date of Patent: Jul. 14, 1992

[54] RELATING TO THE SANITATION OF SWIMMING POOL WATER

[75] Inventor: Robin W. Thornhill, Tarporley, United Kingdom

[73] Assignee: Total Pool Chemicals Ltd., Cheshire, England

[21] Appl. No.: 613,905

[22] PCT Filed: Jun. 2, 1989

[86] PCT No.: PCT/GB89/00613
§ 371 Date: Dec. 7, 1990
§ 102(e) Date: Dec. 7, 1990

[87] PCT Pub. No.: WO89/12606
PCT Pub. Date: Dec. 28, 1989

[30] Foreign Application Priority Data

Jun. 15, 1988 [GB] United Kingdom ............... 8814222

[51] Int. Cl.$^5$ ............................................. C02F 1/76
[52] U.S. Cl. ................................. 210/754; 210/756; 210/760; 210/764
[58] Field of Search .................. 210/96.1, 753, 754, 210/760, 759, 755, 756, 764

[56] References Cited

U.S. PATENT DOCUMENTS

| | | | |
|---|---|---|---|
| 3,926,802 | 12/1975 | Hedgpeth | 210/753 |
| 4,033,871 | 7/1977 | Wall | 210/96.1 |
| 4,385,973 | 5/1983 | Reis et al. | 210/746 |
| 4,411,799 | 10/1983 | Ito et al. | 210/753 |
| 4,451,376 | 5/1984 | Sharp | 210/754 |
| 4,519,914 | 5/1985 | Etani | 210/169 |
| 4,767,511 | 8/1988 | Aragon | 210/754 |
| 4,767,542 | 8/1988 | Worley | 210/764 |
| 4,804,478 | 2/1989 | Tamir | 210/754 |
| 4,818,413 | 5/1989 | Hoover et al. | 210/754 |
| 4,872,999 | 10/1989 | Schild et al. | 210/764 |
| 4,880,547 | 11/1989 | Etani | 210/754 |
| 4,927,546 | 5/1990 | Wiedrich et al. | 210/755 |
| 4,997,574 | 5/1991 | Sarunac | 210/96.1 |

OTHER PUBLICATIONS

*Standard Methods,* American Public Health Association, 1971, pp. 129–132 and 142.

*Primary Examiner*—Stanley S. Silverman
*Assistant Examiner*—Cynthia L. Nessler
*Attorney, Agent, or Firm*—Zarley, McKee, Thomte, Voorhees & Sease

[57] ABSTRACT

A method for sanitizing swimming pool water comprises introducing in controlled amounts, a bromide donor and an oxidizing agent therefor to provide the desired sanitizing action in the pool, measuring the levels of both active bromine and bromide in the treated water and regulating the quantity of materials introduced into the pool accordingly.

9 Claims, No Drawings

RELATING TO THE SANITATION OF SWIMMING POOL WATER

The present invention concerns improvements in or relating to the sanitation of swimming pool water The present invention is also suitable for the treatment of cooling water systems.

Chlorine has previously been used in the treatment of swimming pool water. In an aqueous medium, chlorine forms hypochlorite ions which are oxidizing agents and possess bactericidal power. However, whilst chlorine acts in a sanitizing manner in swimming pools, the hazards of such sanitizing are well-known to swimmers, spectators and maintenance staff, all of whom have to cope with its effects on health, equipment and the bathing environment. In particular, leisure pools are becoming more popular, and with increased agitation due to flumes, water canons, wave machines etc, the problems associated with the use of chlorine are increased. Released into the air by pool activity, chlorine creates a corrosive atmosphere. This unseen irritant can effect the performance of competitive swimmers, repel spectators and shorten the life of expensive air recirculation equipment.

It has also been proposed to utilise bromine for the sanitation of swimming pool water. In such situation bromine in an aqueous medium forms hypobromite ions which again are oxidizing agents and possesses bactericidal power. In fact bromine has a higher bactericidal power than that of chlorine. Furthermore, water treated by bromine does not have the unpleasant odour and does not irritate swimmers to the extent that has been found utilising chlorine treatment.

The use of bromine as a sanitizing agent for swimming pool water suffers from the drawbacks relative to difficulties in the handling of liquid bromine. Thus, problems exist in providing adequate space wherein containers of liquid bromine can be safely stored and handled. Moreover,unacceptable levels of sodium bromide are introduced into the water when liquid bromine is utilised.

U.K. Patent Specification No. 1327531 proposes a method for sanitizing water by utilising a bromide which is oxidized whilst in the water by means of hypochlorite ions. The quantity of hypochlorite ions introduced are regulated in response to a continuous measurement of the amount of active bromine in the treated water. Such patent specification also discloses the use of from 20 to 50 mg per liter of sodium bromide in solution.

In the U.K., the Department of the Environment have indicated that the concentration of sodium bromide should preferably not exceed 15 mg per litre in the pool water. It is believed that such figure could also well apply abroad. Thus, the levels specified in U.K. Patent Specification No. 1327531 are totally unacceptable to current stringent safety levels. In any event, without a test procedure for sodium bromide being available, the Department of the Environment would be extremely unlikely to grant a health and safety acceptance authorisation. Furthermore, we have discovered that the introduction of hypochlorite ions as indicated in such patent specification is based on an incorrect premise. It had previously been thought that as the concentration of bromine ions in the pool water decrease then more hypochlorite ions would be required to oxidise the bromide to produce more bromine ions. This was the situation believed to exist, since when the bromine had carried out its sanitizing action, then it was substantially reconverted back to bromide. It was assumed that bromide was lost only by draining and backwashing, i.e. loss of pool contents.

However, we have now discovered that in fact a substantial proportion of bromide is lost when the pool water is passed through filters for recirculation purposes. Thus, the previous premise in U.K. Patent Specification No. 1327531 that decreased levels of active bromine required increased levels of hypochlorite only was incorrect; rather such decrease in active bromine content also required addition of bromide to make up for losses. Thus, previously, hypochlorite ions would be pumped into the swimming pool water erroneously and in a short time a free chlorine atmosphere would exist which was totally unsuitable and cause the problems referred to above utilizing chlorine as a sanitizing agent.

We have surprisingly discovered that when utilizing a bromide and oxidizing same to bromine in the pool water one must not only measure the amount of active bromine in the treated water, but also the amount of bromide therein. Depending upon the results obtained one can then control the content of chemicals in the water.

According to the present invention there is provided a method for sanitizing swimming pool water which comprises introducing, in controlled amounts, a bromide donor and an oxidizing agent therefor to provide the desired sanitizing action in the pool, measuring the levels of both active bromine and bromide in the treated water and regulating the quantity of materials introduced into the pool accordingly.

It will thus be noted that the method of the present invention provides not only testing for free bromine but also conducting a test for bromide.

In the ensuing description reference will be made to the use of sodium bromide as the bromide donor and hypochlorite as the oxidizing agent. It is to be understood that other bromide donors could be utilised as well as other oxidizing agents, for example ozone or potassium peroxymonosulphate.

Moreover, it is believed that the process of the present invention would also be applicable to the use of an iodide donor, e.g. sodium iodide, instead of a bromide donor; in such case, the method would be modified by carrying out an iodide test instead of the bromide test referred to above. The same oxidizing agents can be used as for bromide treatment.

In addition to monitoring the levels of the various active materials in the swimming pool water, it is also possible to control the amount of bromide in the water so as to comply with official requirements. In this connection, sodium bromide is preferably used in an amount of up to 15 mg per liter, preferably in the range of 9-15 mg per liter.

A suitable testing method for carrying out the method of the present invention is as follows:

REAGENTS

Diphenyldiamine (DPD) chlorine test kit, glycine tablets and a solution of calcium hypochlorite, strength, 1 drop in 10 ml.=2 ppm $Cl_2$.

PROCEDURE

Do a normal free chlorine test. In each of 2 10 ml. cells take 10 ml. tap water for a blank and 5 ml. of sample plus 5 ml. tap water. Treat both as follows: Add 5 drops calcium hypochlorite solution, mix.

Add 1 glycine tablet, crush, mix: Add 1 DPD tablet, crush, mix and measure after 30 secs. using the blank as reference. This is reading (B).

CALCULATION $2 \times (B) -$ free chlorine $=$ Bromide ppm as $Cl_2$.

PARAMETERS

Bromide should be 3-5 ppm as $Cl_2$.

NOTES

1) Some batches of DPD tablets give blanks higher than 0.2 ppm $Cl_2$ and should not be used for this test.
2) The calcium hypochlorite solution loses strength gradually. Test it each week and add a small amount of solid calcium hypochlorite as required to restore it to the level of 1 drop$=$2 ppm $Cl_2$.
3) Automatic chlorine dosing equipment should be recalibrated to agree with the free chlorine readings obtained with NaBr present in the pool.
4) Never mix NaBr with chlorine release chemicals.

NaBr DOSAGE a) Always slug dose to an empty pool.
b) Test level daily and record results and amount dosed.
c) An average 25 m pool will generally use approximately 250 L NaBr per annum. (40% w/v solution).
d) A 25 m pool generally requires an initial dose of 15 L NaB. (40% w/v solution).

With the results obtained, it is possible to dose the recirculating pool water with the active chemicals to give the required levels in the water.

It can thus be seen that the method of the present invention provides the following improvements in indoor swimming pool situations:

1) The bather comfort of the pool water is improved.
2) Competitive swimmers are able to breathe easier.
3) The atmosphere is less corrosive thereby enabling air recirculation even under high bather load conditions.
4) Increased energy saving is possible due to increased recirculation being now possible.
5) Even with substantial agitation of water the atmosphere is satisfactory.
6) The appearance of the pool becomes improved due to improved flocculation achieved utilising the method of the present invention.
7) As a result of carrying out the method of the invention savings on hypochlorite of up to 25% can be achieved.
8) It is possible to utilise the method of the invention operating within the permitted control levels of an amount of NaBr per liter.
9) The carrying out of the test procedure indicated above enable the desired control to be achieved.

It will thus be seen that the present invention provides a method involving a low level bromide test which makes the use of bromide possible in accordance with official health recommendations.

By utilising the method of the present invention, in relation to indoor swimming pools, the particular problems associated with chlorine, for example in leisure pools, flumes, wave machines, water cannons and the like can be overcome. Moreover, in connection with outdoor swimming pools, substantial savings can be achieved due to the bromide providing better tolerance to UV and to temperature than swimming pools containing chlorine. In hot climates it is anticipated that as much as 60% of chlorine usage can be saved by carrying out the method of the present invention in outdoor pools.

It has always been a problem that heavily used swimming pools become malodorous and lose clarity due to the fouling introduced by bathers, in particular fouling by urine. The use of the method of the present invention helps to keep the pools in pleasant condition for longer periods than heretofore, and to restore good conditions more quickly than, for example, hypochlorite alone due to the mechanism of nascent bromine production through the reaction between the bromide donor and the hypochlorite. Moreover, the quicker breakdown of bromamines compared to chloramines helps clear urine products from the pool.

We have now discovered that in order to produce a shock dose of nascent bromine more widely throughout the pool, the application over the pool surface of potassium peroxymonosulphate, known in the trade as Curo or Caroat, was found to freshen up malodorous pools and restore clarity within three hours if the bromide donor was already present in the pool at the recommended level.

With the bromide donor, e.g. sodium bromide at a normal level of 5 ppm, as indicated by the test method referred to above, and the potassium peroxymonosulphate applied widely at 10 ppm, we have found that nascent/bromine is produced equivalent to 0.5 ppm as $Cl_2$ as indicated by the DPD No. 1 test method.

The effect of this nascent bromine produced widely throughout the pool combined with the peroxy effect of the potassium peroxymonosulphate produces a synergistic beneficial effect. It is noted that a similar result when the chemicals are added in reserve order is not obtained. Furthermore, the rate of reaction between sodium bromide and potassium peroxymonosulphate is governed by the short half life of potassium peroxymonosulphate which, under normal pool conditions, is 12 minutes. Thus, the pool can be restored to a clear, odour-free condition and be safe for bathers within a few hours.

The breakdown product of potassium peroxymonosulphate is potassium sulphate. As indicated above, the effected dose rate of potassium peroxymonosulphate is of the order of 10 ppm. Thus, it will be noted that no build-up of undesirable chemicals is caused in the pool even if it is necessary to dose with potassium peroxymonosulphate daily in order to combat extreme bather load.

It will thus be seen that by appropriate control of the levels of chemicals utilised in the method of the present invention, when the swimming pool water is being recirculated, an atmosphere can be obtained which is beneficial to all user of such pools.

Whilst the method of the present invention has been specifically described in relation to swimming pools, it is also applicable to the controlled bromination of cooling water systems. Such systems include closed and open systems and also include condensers associated with power station turbines. This control should be such that there is sufficient bromide to react with added hypochlorite/oxidizer but not be in large excess. This is to comply with Health Authority bromide discharge levels.

According to a further aspect of the invention there is provided a method for the controlled bromination of cooling water systems comprising introducing, in controlled amounts a bromide donor and an oxidizing agent therefor to provide sufficient bromide to react with the oxidizing agent, characterised in that the levels of both active bromine and bromide in the treated water are measured and in that the quantity of materials introduced into the cooling water system are regulated accordingly.

The bromide donor and oxidizing agent utilised are the same as used in the sanitizing of swimming pool water referred to above.

I claim:

1. A method for sanitizing swimming pool water comprising introducing, in controlled amounts, a bromide donor and an oxidizing agent therefor to provide the desired sanitizing action in the pool, wherein the levels of both active bromine and bromide in the treated water are measured and wherein said controlled amounts introduced into the pool are regulated in response to said measured levels.

2. A method as claimed in claim 1, wherein the bromide donor is sodium bromide.

3. A method as claimed in claim 2, wherein the sodium bromide is utilised in an amount of 9-15 mg per liter.

4. A method as claimed in claim 1, 2 or 3 wherein the oxidizing agent is a hypochlorite or ozone.

5. A method as claimed in claim 1, 2 or 3, wherein the oxidizing agent is potassium peroxymonosulphate, which is added to the water after addition of the bromide donor.

6. A method as claimed in claim 5, wherein the bromide donor is applied at a level of 5 ppm and the potassium peroxymonosulphate is applied at a level of 10 ppm.

7. A method for sanitizing swimming pool water which comprises introducing, in controlled amounts, an iodide donor and an oxidizing agent therefor to provide the desired sanitizing action in the pool, wherein the levels of both active iodine and iodide in the treated water are measured and wherein said controlled amounts introduced into the pool are regulated in response to said measured levels.

8. A method as claimed in claim 7, wherein the iodide donor is sodium iodide.

9. A method as claimed in claim 7 or 8, wherein the oxidizing agent is a hypochlorite, ozone or potassium peroxymonosulphate.

* * * * *